United States Patent Office 3,325,243
Patented June 13, 1967

3,325,243
PROCESS FOR THE PREPARATION OF A TITANATE CONTAINING LITHIUM AND POTASSIUM
Foord von Bichowsky, 1620 Harvey Road, Wilmington, Del. 19803
No Drawing. Filed Sept. 29, 1965, Ser. No. 491,375
1 Claim. (Cl. 23—51)

This invention has to do with a process for the preparation of an alkali metal titanate containing lithium and potassium and particularly the novel hexatitanate of those two alkali metals wherein they are present in equimolar proportions.

In my pending U.S. Patent application Ser. No. 308,078, filed Sept. 11, 1963, I described a process for the manufacture of alkali metal titanates containing sodium and potassium by reacting in the dry way some double salts of those two alkali metals with various proportions and varieties of titanium dioxide at elevated temperatures, for example 900° to 1000° C., so as to produce alkali metal titanates containing both of the cited alkali metals and I claimed especially the novel sodium potassium hexatitanate corresponding to the formula $NaKTi_6O_{13}$ and tetragonal in habit.

The results obtained encouraged me to study other possible combinations of various alkali metals with titanium dioxide.

In the literature there is cited (Zeitschrift f. physikalische Chemie, vol. 21, pp. 557-8 (1896)) a compound $(LiK)O \cdot CO_2$ stable at ca. 500° C. However such a range of stability for that double alkali metal carbonate is far below the temperature, e.g., 900°-1200° C., at which titanium dioxide is known to combine completely with alkali metal carbonates. Nevertheless on attempting to react the above mentioned lithium potassium carbonate with titanium dioxide I made the surprising discovery that not only would it react completely at the cited temperature of 550° C. but that the hexatitanate crystals formed, in contrast to those of my earlier work, belonged to the monoclinic system and were extremely small but well defined.

The application of the above discovery and its extensions to the process of the present invention will be illustrated by the following non-restrictive examples in which the proportions, when not otherwise state, are by weight.

*Example 1.*—5.2 parts of a 92% $TiO_2$ product, as obtained in the manufacture of titanium dioxide by hydrolysis followed by a calcination of the filter cake at below a temperature of crystallization, were intimately mixed with 1.07 parts of 94% $KHCO_3$ and the mixture neutralized with 4.8 parts by volume of a nearly saturated solution of hydrated lithium hydroxide ($LiOH \cdot H_2O$) containing the equivalent of 8.8% LiOH. The resulting thick slurry was dried and the cake was calcined for 1½ hours at 500°±20° C. The resulting white, readily crushed product was found to have a density of 3.02-3.06 and in the unground state consisted of very fine monoclinic particles which, measured from an electron microscope photograph, were approximately 0.025 micron in size.

This essentially microcrystalline product exhibited the following X-ray diffraction pattern.

| Interplanar spacings (Angstroms) | Relative intensity |
|---|---|
| ~7.1 | 60 |
| 5.05 | 70 |
| 4.78 | 70 |
| 3.56 | 30 |
| 3.19 | 100 |
| 3.03 | 10 |
| 2.95 | 10 |
| 2.79 | <10 |
| 2.69 | <10 |
| 2.52 | 50 |
| 2.46 | 80 |
| 2.39 | <10 |
| 2.25 | 40 |
| 2.22 | 60 |
| 2.09 | 50 |
| 2.07 | 40 |
| 2.03 | <10 |
| 1.98 | 50 |

*Example 2.*—5 parts of lithium carbonate were ground with 9.5 parts of potassium carbonate (a slight excess over theory) and slowly heated in a platinum dish to 500° C. The resulting clear eutectic melt was quickly decanted from a trace of unreacted material (apparently potassium carbonate). Then 1 part of the decanted material was finely ground into 4.54 parts of dried reagent grade $TiO_2$ and the mixture moistened, dried and calcined for one hour at ca. 500° C. When cold the product was weighed, crushed, moistened and recalcined for another hour at not above 520° C. No detectable change in weight occurred. The initial loss in weight in both of the examples agreed with the theoretical.

Among the possible uses for the new product may be mentioned: reinforcement of elastomers and improving the handling and processing characteristics of plastics. These suggested applications for this new product are only for the purpose of illustration and are not limitive since what is specific to the invention is embodied and defined in the following claim.

I claim:
A process for the manufacture of monoclinic crystals of lithium potassium hexatitanate which consists in heating at a temperature not above about 550° C. until reaction is complete, a mixture of $TiO_2$, a potassium carbonate and a lithium compound selected from the group consisting of lithium hydroxide and lithium carbonate and then cooling and crushing the resulting white pulverulent hexatitanate.

References Cited
UNITED STATES PATENTS

| 1,731,364 | 12/1929 | Bishowsky | 23—51 |
| 1,929,521 | 10/1933 | Ryan et al. | |
| 2,758,911 | 8/1956 | Lynd et al. | 23—51 |
| 2,841,470 | 7/1958 | Berry | 23—51 |
| 3,129,105 | 4/1964 | Berry et al. | 23—51 X |

OSCAR R. VERTIZ, *Primary Examiner.*
H. T. CARTER, *Assistant Examiner.*